(12) United States Patent
Umemoto (10) Patent No.: US 6,369,950 B1
(45) Date of Patent: Apr. 9, 2002

(54) LIQUID-CRYSTAL DISPLAY DEVICE AND LIGHT PIPE

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/703,658

(22) Filed: Nov. 2, 2000

(30) Foreign Application Priority Data

Nov. 2, 1999 (JP) ............................................ 11-311916

(51) Int. Cl.$^7$ ........................ G02B 27/110; G02B 6/00; G02F 11/33; G02F 1/1335
(52) U.S. Cl. ........................ 359/628; 385/901; 362/561
(58) Field of Search .............................. 359/619, 823, 359/828, 836; 385/14, 131, 901, 37; 362/551, 561, 31; 349/63, 64, 65, 186

(56) References Cited

U.S. PATENT DOCUMENTS

| 6,152,570 A | * 11/2000 | Yokoyama ................. 362/31 |
| 6,166,799 A | * 12/2000 | Kameyama et al. ......... 349/185 |
| 6,224,223 B1 | * 5/2001 | Hinguchi et al. ............. 362/31 |
| 6,259,854 B1 | * 7/2001 | Shinji et al. ................ 385/146 |
| 6,323,919 B1 | * 11/2001 | Yang et al. .................. 349/63 |

FOREIGN PATENT DOCUMENTS

| JP | 9-269487 | 10/1997 | ......... G02F/1/1335 |
| JP | 10-106328 | 4/1998 | ............. F21V/8/00 |

OTHER PUBLICATIONS

Patent Abstract of Japan, 09-269487, Oct. 14, 1997.
Patent Abstract of Japan, 10-106328, Apr. 24, 1998.

* cited by examiner

*Primary Examiner*—Georgia Epps
*Assistant Examiner*—Saeed H Seyrafi
(74) *Attorney, Agent, or Firm*—Sughrue Mion, PLLC (57) ABSTRACT

In a liquid-crystal display device, a light pipe including an upper surface, a lower surface opposite to the upper surface, an incidence side surface, and a light output means formed in the upper surface is provided, the light pipe has a retardation of not larger than 40 nm between the upper and lower surfaces. Further, a light source is disposed on the incidence side surface, a reflection layer is disposed on the lower surface, and a liquid-crystal shutter is disposed on the upper surface and includes a liquid-crystal cell and at least one polarizer. Light incident on the incidence side surface from the light source goes out from the lower surface through the light output means, the outgoing light is then reflected on the reflection layer, and the reflected light is then transmitted through the light pipe so as to go out from the upper surface finally.

20 Claims, 3 Drawing Sheets

LIQUID-CRYSTAL DISPLAY DEVICE AND LIGHT PIPE

BACKGROUND OF THE INVENTION

1. Field of the Invention

The present invention relates to a liquid-crystal display device excellent in light utilizing efficiency, in brightness and in easiness of viewing, and to a light pipe which can be used for forming the liquid-crystal display device.

The present application is based on Japanese Patent Application No. Hei. 11-311916, which is incorporated herein by reference.

2. Description of the Related Art

Recently, discussion is made about a reflection-transmission double type liquid-crystal display device in which an illumination unit is provided so that the device can be viewed as a transmission type liquid-crystal display device in a dark while using the merit of a reflection type liquid-crystal display device which does not consume much electric power. For example, there is such a proposal that a liquid-crystal display device using a half-transmission type reflector, a liquid-crystal display device in which a back-lighting unit used in a transmission type liquid-crystal display device is disposed on the visual side of a liquid-crystal cell so as to be used as a front-lighting unit, and so on.

The system using a half-transmission type reflector, however, had a disadvantage in that the system was inferior in brightness in either mode to an exclusive reflection or transmission type liquid-crystal display device because light was separated into reflected light and transmitted light by the half-mirror effect of the half-transmission type reflector. There might be a proposal to perform improvement by use of a reflection polarizer which reflects polarized light so selectively that the sum of reflectance and transmittance can exceed 100%. Light utilizing efficiency in a transmission mode was, however, lowered to 50% or less because of absorption by a light absorber disposed for preventing reversal of display between reflection and transmission modes and for preventing drifting of black display. There was a problem that display was hardly viewed in either mode at twilight. Also in the front-lighting system, display was apt to be dark in a transmission mode compared with the general transmission type liquid-crystal display device because light went to the liquid-crystal cell, or the like, and came back. There was a problem that a fault or dirt on a light pipe became conspicuous as a bright spot. Moreover, there was a problem that display contrast was lowered by light leaking from the upper surface of the light pipe.

SUMMARY OF THE INVENTION

An object of the present invention is to develop a liquid-crystal display device of good visibility excellent in brightness in both reflection and transmission modes and free from generation of reversal of display and lowering of contrast due to leaking light.

According to the present invention, there is provided a liquid-crystal display device comprising: a light pipe including an upper surface, a lower surface opposite to the upper surface, an incidence side surface and a light output means formed in the upper surface, the light pipe having a retardation of not larger than 40 nm between the upper and lower surfaces; a light source disposed on the incidence side surface; a reflection layer disposed on the lower surface; and a liquid-crystal shutter disposed on the upper surface and including a liquid-crystal cell and at least one polarizer, whereby light incident on the incidence side surface from the light source goes out from the lower surface through the light output means, the outgoing light is then reflected on the reflection layer, and the reflected light is then transmitted through the light pipe so as to go out from the upper surface finally.

According to the present invention, there is provided a structure in which a light pipe free from generation of the retardation is disposed between a liquid-crystal cell and a reflection layer. Hence, the state of linear polarization through a polarizer hardly changes, so that display irregularity due to variation in brightness, irregularity in color, etc. hardly occurs. Moreover, lowering of light utilizing efficiency in a reflection mode is so slight as represented by absorption loss, reflection loss, etc. due to the light pipe. Hence, brightness substantially equal to that of the background-art reflection type liquid-crystal display device can be achieved in the reflection mode. Moreover, brightness equal to that of the background-art transmission type liquid-crystal display device can be achieved also in a transmission mode.

A liquid-crystal display device of good visibility can be obtained without occurrence of reversal of display due to reflection and transmission and without occurrence of lowering of contrast due to light leaking from the light pipe. Moreover, the provision of a light output means in the upper surface of the light pipe permits the optical path in the light pipe to be elongated in a transmission mode. Hence, the spread of light can be widened, so that the intensity of the emission lines can be relaxed. This acts advantageously on prevention of moire and improvement of uniformity of display. The reflection layer can be disposed closely and easily on the lower surface of the light pipe through an adhesive layer, or the like, so as to be integrated with the light pipe.

In addition, in the case of a light pipe having a light output means constituted by slopes such as prism-like irregularities, the light pipe is excellent in directivity of light reflected by the slopes. Hence, light favorable to viewing in a transmission mode can be generated efficiently, so that brighter display can be obtained. Moreover, the light pipe is excellent in incidence efficiency of external light and transmittance after reflection. Hence, brighter display can be obtained also in a reflection mode by light emission good in light utilizing efficiency and excellent in uniformity. Moreover, the occurrence of moire due to the directivity can be suppressed by oblique arrangement of the light output means. Hence, glaring light can be prevented from disturbing visual recognition.

If the retardation due to the light pipe is large in the above description, linearly polarized light through a polarizer of a liquid-crystal shutter is elliptically polarized in a reflection mode because of the retardation while the linearly polarized light goes to the light pipe and comes back through the reflection layer. Hence, an absorbed component is created when the light enters the polarizer again. As a result, brightness is lowered. Moreover, coloring is generated by wavelength dispersion due to the retardation. Moreover, if the retardation varies in accordance with the position and direction of transmission of light because of variation in the retardation, brightness varies in accordance with the position and direction of transmission of light. This causes display irregularity. Moreover, variation in color is created because of colorlessness and coloring to different colors such as navy blue, blue, etc. in accordance with the position and direction of transmission of light due to the wavelength dispersion. This also causes display irregularity.

On the other hand, in the case where a light output means is provided in the lower surface of the light pipe, from the point of view of keeping the function of the light output means it is necessary that an independent reflector is disposed separately. The light pipe becomes complex in structure because of the arrangement and fixation of the reflector as well as the number of parts is increased. Hence, a thick support is required for preventing display from being disordered by wrinkling. There is a disadvantage in that the light pipe becomes heavy.

Further, in the case of a light pipe having a scattering type light output means such as dot-like or embossed irregularities, display is hard to view in a frontal (perpendicular) direction in a transmission mode because light outputs at a large angle of about 60 degrees. If a prism sheet is disposed for the purpose of controlling the optical path, display becomes very dark in a reflection mode because light is scattered so that a greater part of light does not contribute to the display. Moreover, dots, or the like, are viewed clearly. If a diffusing layer having strong diffusing characteristic is disposed for preventing the dots from being viewed clearly, display becomes dark because both the incident light in the reflection mode and the light reflected by the reflection layer are scattered.

Features and advantages of the invention will be evident from the following detailed description of the preferred embodiments described in conjunction with the attached drawings.

DETAILED DESCRIPTION OF THE PREFERRED EMBODIMENTS

According to the present invention, the a liquid-crystal display device comprises: a light pipe including an upper surface, a lower surface opposite to the upper surface, an incidence side surface and a light output means formed in the upper surface, the light pipe having a retardation of not larger than 40 nm between the upper and lower surfaces; a light source disposed on the incidence side surface; a reflection layer disposed on the lower surface; and a liquid-crystal shutter disposed on the upper surface and including a liquid-crystal cell and at least one polarizer, whereby light incident on the incidence side surface from the light source goes out from the lower surface through the light output means, the outgoing light is then reflected on the reflection layer, and the reflected light is then transmitted through the light pipe so as to go out from the upper surface finally.

Figure 1:
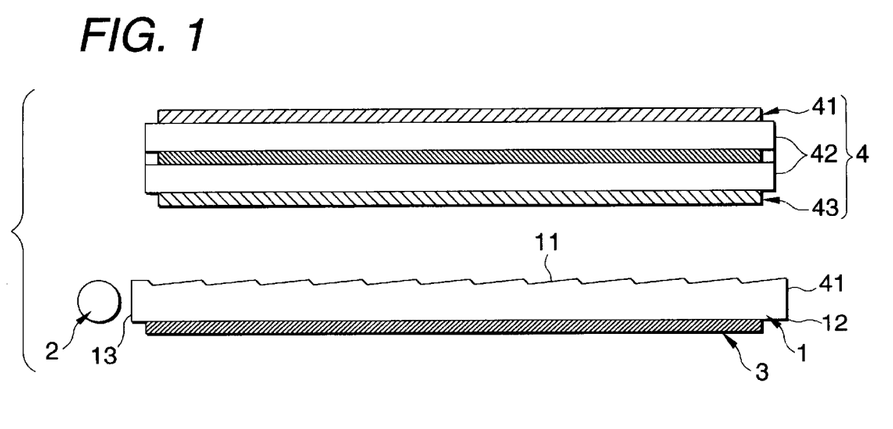
FIG. 1 is a sectional view showing an example of a liquid-crystal display device.

The liquid-crystal display device according to the present invention can be used preferably as a reflection-transmission double type liquid-crystal display device. FIG. 1 shows an example of the liquid-crystal display device. In FIG. 1, the reference numeral 1 designates a light pipe; 11, an upper surface of the light pipe in which a light output means is formed; 2, a light source; 3, a reflection layer; 4, a liquid-crystal shutter; 41, 43, polarizers; and 42, a liquid-crystal cell.

As shown in FIG. 1, the light pipe is constituted by a plate-like member having an upper surface 11, a lower surface 12 opposite to the upper surface, and an incidence side surface 13 as a side surface between the upper and lower surfaces. A light output means is formed in the upper surface 11 so that light incident on the incidence side surface exits from the lower surface through the light output means. The plate-like member to be used has a retardation of not larger than 40 nm between the upper and lower surfaces.

The light pipe may be of an uniform thickness type as shown in FIG. 1 or may be of a type in which a counter end 14 opposite to the incidence side surface 13 is thinner than that of the incidence side surface 13. The reduction in thickness of the counter end is favorable for reduction in weight, improvement of efficiency of entrance of light incident on the incidence side surface to the light output means formed in the upper surface, and so on.

Figure 2:
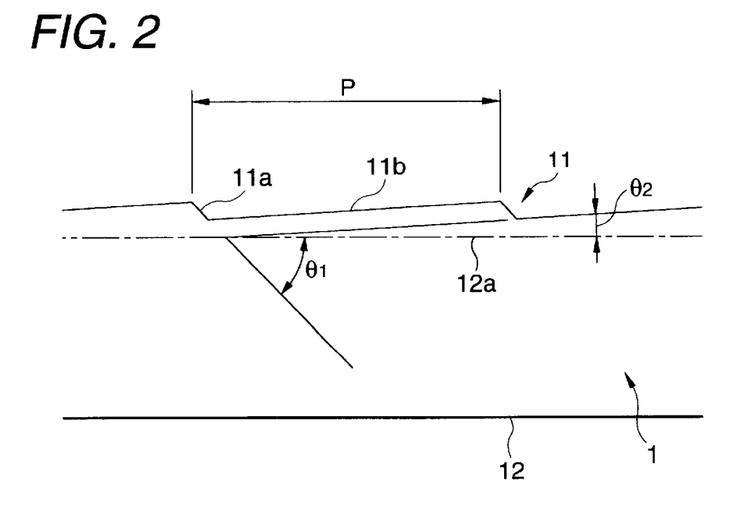
FIG. 2 is a side view showing a light output means in a light pipe.

The light output means formed in the upper surface of the light pipe may be made of a suitable material exhibiting the aforementioned light output characteristic. From the point of view of obtaining illumination light excellent in frontal directivity through the reflection layer, it is preferable that a light output means has slopes facing the incidence side surface, particularly a light output means constituted by prism-like irregularities. Although the prism-like irregularities may be constituted by convex or concave portions each having equal-side surfaces, from the point of view of light utilizing efficiency, etc., it is preferable that the prism-like irregularities are constituted by convex or concave portions each having a combination of a short side surface and a long side surface. FIG. 2 shows an example of the prism-like irregularities. In FIG. 2, the reference numeral 11a designates a short side surface; and 11b, a long side surface.

From the point of view of achievement of characteristic such as frontal directivity, a preferable light output means is constituted by a repetitive structure of irregularities each having a combination of a slope inclined at an inclination angle in a range of from 35 to 45 degrees with respect to a reference plane of the lower surface and a flat surface inclined at an inclination angle of not larger than 10 degrees with respect to the reference plane. Especially, the preferred light output means is constituted by a repetitive structure of prism-like irregularities each having a combination of a short side surface 11a ($\theta_1$) inclined down from the incidence side surface 13 side to the counter end 14 side at an inclination angle in a range of from 35 to 45 degrees with respect to the reference plane 12a of the lower surface 12 and a long side surface 11b ($\theta_2$) inclined at an inclination angle in a range of from 0 (not inclusively) to 10 degrees with respect to the reference plane 12a as shown in FIG. 2.

In the above description, the short side surfaces 11a formed as slopes inclined down from the incidence side surface to the counter end side have a role of reflecting light given to the short side surfaces 11a among all light incident on the side surface to thereby supply the reflected light to the lower surface (reflection layer). In this case, setting the inclination angle $\theta_1$ of each of the short side surfaces to be in a range of from 35 to 45 degrees permits transmission light to be reflected with good perpendicularity with respect to the lower surface as indicated by the broken-line arrow in FIG. 3 so that outgoing light (illumination light) excellent in frontal directivity can be obtained efficiently through the reflection layer 3. From the point of view of frontal directivity, etc., the preferable inclination angle $\theta_1$ of each of the short side surfaces is in a range of from 38 to 44 degrees, particularly in a range of from 40 to 43 degrees in consideration of the fact that the condition for total reflection of light transmitted in the inside of the light pipe made of polymethyl methacrylate is generally ±41.8 degrees on the basis of Snell laws of refraction, On the other hand, the long side surfaces are provided for the purposes of: turning over the reflected light from the short side surfaces through the reflection layer 3 so that the light is transmitted through the long side surfaces as indicated by the broken-line arrow in FIG. 3; and receiving external light in a reflection mode so that the external light is reflected by the reflection layer 3 and transmitted through the long side surfaces as indicated by the polygonal-line arrow in FIG. 4. It is preferable from this point of view that the inclination angle $\theta_2$ of each of the long side surfaces with respect to the reference plane 12a of the lower surface is not larger than 10 degrees. If the inclination angle $\theta_2$ is larger than 10 degrees, the optical path change due to refraction becomes so large that the quantity of light in the frontal direction is reduced unfavorably for display.

Although the inclination angle $\theta_2$ of each of the long side surfaces may be 0 degrees (horizontal), setting the angle to be larger than 0 degrees permits transmission light to be collimated when the transmission light incident on the long side surfaces is reflected to be supplied to the short side surfaces. In this case, directivity of light reflected by the short side surfaces can be enhanced to be favorable for display. From the point of view of the aforementioned performance such as increase of the quantity of light in the frontal direction, collimation of transmission light, etc., the preferred inclination angle $\theta_2$ of each of the long side surfaces is not larger than 8 degrees, particularly not larger than 5 degrees.

From the point of view of the aforementioned function of the long side surfaces of the light pipe, etc., the preferred long side surfaces are long side surfaces in which the angle difference in inclination angle $\theta_2$ between the long side surfaces is set to be not larger than 5 degrees, particularly not larger than 4 degrees, more particularly not larger than 3 degrees on the whole of the light pipe and in which the difference in inclination angle $\theta_2$ between adjacent ones of the long side surfaces is set to be not larger than 1 degree, particularly not larger than 0.3 degrees, more particularly not larger than 0.1 degrees. The angle difference in inclination angle $\theta_2$ is determined on the assumption that the inclination angle of each of the long side surfaces is not larger than 10 degrees as described above. That is, the angle difference is determined on the assumption that deflection of the display image owing to refraction of light transmitted through the long side surfaces is suppressed to set the small inclination angle $\theta_2$ to be in an allowable range. This purpose is that the optimum viewing direction of the liquid-crystal display device optimized by setting a point of observation in a direction approximate to the perpendicular direction is prevented from being changed.

From the point of view of obtaining a bright display image, it is preferable that the light pipe is excellent in efficiency of incidence of external light and excellent in efficiency of transmission of the display image through the liquid-crystal cell or efficiency of output of the display image from the liquid-crystal cell. From this point of view, the light pipe is preferably provided as a light pipe having prism-like irregularities in which the projected area of the long side surfaces on the reference plane of the lower surface is not smaller than 8 times, particularly not smaller than 10 times, more particularly not smaller than 15 times as large as that of the short side surfaces. Hence, a great part of the display image generated by the liquid-crystal cell can be transmitted through the long side surfaces.

Incidentally, in transmission of the display image through the liquid-crystal cell, the display image incident on the short side surfaces is reflected on the incident side surface so as not to be output from the upper surface or is deflected so as to be output in a direction largely different from and opposite to the direction of the display image transmitted through the long side surfaces with a normal line with respect to the lower surface as a reference. Hence, the display image incident on the short side surfaces has little influence on the display image transmitted through the long side surfaces.

Hence, it is preferable from the aforementioned point of view that the short side surfaces are not localized with respect to pixels of the liquid-crystal cell. Tout it strongly at its most extreme, if the short side surfaces overlap the pixels wholly, the display image can be little viewed in proximity to the perpendicular direction through the long side surfaces. Hence, from the point of view of prevention of unnatural display due to shortage of transmission of display light, etc., the area of overlap of the pixels with the short side surfaces is preferably reduced to thereby keep the light transmittance of the long side surfaces sufficient.

In consideration that the pixel pitch of the liquid-crystal cell is generally in a range of from 100 to 300 $\mu$m, it is preferable from the aforementioned point of view and from a point of view of easiness of formation of prism-like irregularities, etc. that each of the short side surfaces is formed to be not larger than 40 $\mu$m, particularly in a range of from 1 to 20 $\mu$m, more particularly in a range of from 3 to 15 $\mu$m in terms of the projected width thereof on the reference plane of the lower surface.

Incidentally, as the projected width of the short side surface decreases, a higher-grade technique is required for forming the short side surface. If the vertices of the prism-like irregularities are rounded with a curvature of radius not smaller than a predetermined value, a scattering effect appears to cause disorder of the display image, etc. Further, because the coherence length of a fluorescent tube is generally set to be about 20 $\mu$m, reduction of the projected width of the short side surface causes diffraction easily so that the display quality is lowered.

It is preferable from the aforementioned point of view that the distance between adjacent ones of the short side surfaces is large. As described above, however, the short side surfaces serve as a functional portion for substantially outputting light incident on the side surface. Hence, if the distance is too large, illumination at the time of switching-on becomes so sparse that display may be unnatural. In consideration of these, the repetition pitch P of the prism-like irregularities as shown in FIG. 2 is preferably set to be in a range of from 50 $\mu$m to 1.5 mm. Incidentally, the pitch may be irregular as represented by a random pitch or a random or regular combination of a predetermined number of pitch units. Generally, the pitch may be preferably constant.

When the light output means is constituted by prism-like irregularities, moire may occur because of interference between the light output means and the pixels of the liquid-crystal cell. Although prevention of moire can be made by the adjustment of the pitch of the prism-like irregularities, the pitch of the prism-like irregularities is limited to the aforementioned preferred range. Hence, measures against the case where moire occurs in the pitch range are a subject of discussion.

According to the present invention, a method in which the prism-like irregularities are formed to be inclined with respect to the reference plane of the incidence side surface so that the prism-like irregularities can be arranged to cross the pixels is preferably used for prevention of moire. On this occasion, if the inclination angle is too large, deflection occurs in reflection through the short side surfaces. As a result, large deviation occurs in the direction of output light. Hence, anisotropy in the intensity of light emission in the light-transmitting direction of the light pipe becomes large, so that light utilizing efficiency is lowered. This is apt to cause lowering of display quality.

From the aforementioned point of view, it is preferable that the inclination angle of the direction of arrangement of the prism-like irregularities, that is, the direction of the ridgeline of the prism-like irregularities with respect to the reference plane of the incidence side surface is set to be in a range of ±35 degrees, particularly in a range of ±30 degrees, more particularly in a range of ±25 degrees. Incidentally, the symbol "+" means the direction of inclination with the incidence side surface as a reference. If the resolution of the liquid-crystal cell is so low that no moire occurs or moire is negligible, it is preferable that the prism-like irregularities are arranged to be as parallel with the incidence side surface as possible.

The light pipe can be formed into a suitable shape as described above. Also in the case where the light pipe is shaped like a wedge, etc., the surface shape cane determined suitably. For example, a suitable surface shape such as a linear surface or a curved surface can be used. Further, the slopes or prism-like irregularities constituting the light output means may be formed into a suitable surface shape such as a linear surface, a folded surface or a curved surface.

Further, the prism-like irregularities may be constituted by a combination of irregularities different in shape, etc. in addition to pitch. In addition, the prism-like irregularities may be formed as a series of convex or concave portions having ridgelines continuously connected to one another or may be formed as intermittent convex or concave portions discontinuously arranged at intervals of a predetermined distance in the direction of the ridgeline.

The shape of the lower surface or incidence side surface in the light pipe is not particularly limited and may be determined suitably. Generally, a flat surface is formed as the lower surface and a surface perpendicular to the lower surface is formed as the incidence side surface. For example, a shape such as a concavely curved shape corresponding to the outer circumference of the light source may be used as the shape of the incidence side surface so that efficiency of incidence of light can be enhanced. Further, the incidence side surface may be provided as an incidence side surface structure having an introduction portion interposed between the light source and the light pipe. In this case, the introduction portion can be formed into a suitable shape corresponding to the light source, or the like.

The light pipe can be made of a suitable material exhibiting transparency in accordance with the wave range of the light source. Incidentally, examples of the material to be used in a visible light range include transparent resin such as acrylic resin, polycarbonate resin or epoxy resin, glass, etc. Especially, from the point of view of the formation of a light pipe having a retardation of 40 nm between the upper and lower surfaces, a material exhibiting no birefringence or small birefringence may be used preferably.

The light pipe can be formed by a suitable method such as a cutting method. From the point of view of mass production, examples of the preferable production method include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, ultraviolet rays or radial rays is polymerized in the condition that the fluid resin is cast in a mold capable of forming a predetermined shape or the mold is filled with the fluid resin; and so on.

The thickness of the light pipe can be determined suitably in accordance with the size of the light pipe, the size of the linear light source, etc. in accordance with the purpose of use. Generally, the thickness of the light pipe to be used for forming a liquid-crystal display device, or the like, is not larger than 5 mm, particularly in a range of from 0.1 to 3 mm, more particularly in a range of from 0.3 to 2 mm in terms of the thickness of the incidence side surface. Incidentally, the light pipe need not be formed as a monolithic single-layer plate made of one kind of material. For example, the light pipe may be formed as a laminate of parts made of one kind of material or different kinds of materials. For example, the light pipe may be provided as a plate in which a sheet having a light output means (upper surface) such as prism-like irregularities adheres to a light guide portion for performing transmission of light.

From the point of view of prevention of display irregularity, the preferred retardation between the upper and lower surfaces of the light pipe is not larger than 35 nm, particularly not larger than 30 nm, more particularly not larger than 25 nm. It is preferable that variation in the retardation in accordance with the position is as small as possible. The reduction of the retardation may be achieved by a suitable method. For example, the reduction of the retardation can be made also by a method in which internal distortion is removed by known means such as annealing the light pipe. Incidentally, the aforementioned requirement for the retardation need not be satisfied by the whole surface of the light pipe if the requirement can be satisfied by a range of the light pipe used for display. That is, it is necessary that all the range used for display satisfies the requirement. It is further preferable that the retardation is based on light in a visible range, particularly light with a wavelength of 550 nm.

From the point of view of achievement of bright display, a preferred light pipe to which any reflection layer is not attached yet has a feature that the total light transmittance of incident light in the vertical direction, especially from the lower surface to upper surface, is not lower than 90%, particularly not lower than 95%, more particularly not lower than 95% and that the haze is not higher than 30%, particularly not higher than 15%, more particularly not lower than 10%.

In the light pipe according to the present invention, incident light from the upper and lower surfaces is transmitted well to exit from the lower or upper surface. Hence, accurately collimated light can be output in a direction excellent in perpendicularity favorable to viewing by use of the light pipe so that light from the light source is utilized efficiently. Moreover, the state of polarization can be kept good. Hence, there can be formed various devices such as a reflection-transmission double type liquid-crystal display device which is bright, easy to view and excellent in power saving.

The arrangement of the reflection layer is essential to the reflection-transmission double type liquid-crystal display device for achieving display in a reflection mode. According to the present invention, the reflection layer is disposed on the lower surface 12 of the light pipe 1 as shown in FIG. 1. The reflection layer 3 may be disposed separately from the lower surface of the light pipe. The reflection layer 3, however, is preferably stuck fast to the lower surface so as to be integrated with the light pipe as shown in FIG. 1.

The reflection layer may be formed of a suitable material according to the background art. Especially, examples of the preferred reflection layer include: a coating layer containing powder of high-refractive-index metal or alloy such as aluminum, silver, gold, copper or chromium in a binder resin; a layer of a metal or dielectric multilayer thin film deposited by a suitable thin-film forming method such as a vapor deposition method, a sputtering method, or the like; a reflection sheet having the coating or deposited layer supported by a substrate made of a film, or the like; a sheet of metal foil; and so on.

From the point of view of relaxation of the intensity of the emission line to prevent moire, improvement of uniformity of display, and so on, the preferred reflection layer is formed so that diffuse reflection occurs. Because great reduction of light directivity is unfavorable, the preferred intensity of diffusion may be in a range of from about 5 degrees to about 15 degrees in terms of average diffusion angle but is not limited thereto. The diffuse type reflection layer can be formed by a suitable method in accordance with the background art such as a method of roughening the reflection surface.

The process of sticking the aforementioned reflection layer fast to the lower surface of the light pipe to thereby integrate the reflection layer with the light pipe can be performed by a suitable method such as a method using an adhesive means such as a tacky layer or another adhesive layer or a method of forming the aforementioned coating or deposited layer directly on the lower surface of the light pipe. In this case, from the point of view of prevention of injury, oxidation, deterioration, etc. of the reflection surface, it is preferable that the outer surface of the reflection layer is coated and protected. From this point of view, the aforementioned reflection sheet may be used preferably. In the case of using the reflection sheet, the aforementioned diffuse type reflection layer can be formed easily by roughening the surface of the film base of the reflection sheet.

The process of roughening the surface of the reflection layer itself or of the support base of the reflection layer can be performed by a suitable method. Examples of the suitable method include: mechanical or chemical processing method such as embossing, buffing, transferring a rough-surface shape of a mold, or the like; a method of making suitable particles contained in the surface; and a method of applying a layer containing such particles. Examples of the particles include inorganic particles and organic particles. The inorganic particles are made of silica, alumina, titania, zirconia, tin oxide, indium oxide, cadmium oxide, antimony oxide, etc. and may be electrically conductive. The organic particles are made of a crossedlinked or non-crosslinked polymer, or the like.

For the formation of the liquid-crystal display device, as shown in FIG. 1, the light source 2 is disposed on the incidence side surface 13 of the light pipe 1 to thereby form a side-lighting type back-lighting unit. A suitable material may be used as the light source. Examples of the material to be used preferably as the light source include: a linear light source such as a (cold- or hot-) cathode tube; a point light source such as a light-emitting diode; an array of point light sources arranged linearly or planarly; and a light source using a device for converting a point light source into a state of linear light emission at regular or irregular intervals.

According to the present invention, the light source permits display to be viewed in a transmission mode. Hence, it is not necessary to switch on the light source when display is viewed in a reflection mode. Hence, the light source is provided so as to be able to be switched on/off. Any suitable method can be used as the method of switching on/off the light source. Any one of the background-art methods may be used. Incidentally, the light source may be attached to the light pipe in advance so that the light pipe can be disposed as a light pipe having a light source.

For the formation of the liquid-crystal display device, the light source 2 may be provided as a combination body in which a suitable assisting means such as a light source holder for enclosing the light source to lead light scattered from the light source to the incidence side surface 13 of the light pipe 1 as occasion demands. A resin sheet having a high-reflectance metal thin film attached thereto, a sheet of metal foil, or the like, is generally used as the light source holder. When the light source holder is bonded to an end portion of the light pipe through an adhesive agent, or the like, the formation of the light output means in the adhesive portion can be omitted.

Generally, as shown in FIG. 1, the liquid-crystal display device is formed by assembling a liquid-crystal cell 42 having a transparent electrode (not shown) functioning as a liquid-crystal shutter, a driver attached to the liquid-crystal cell, a polarizer 41, a back-lighting unit 1, 2, and a reflection layer 3 and by assembling constituent parts such as a compensatory retarder plate, etc. suitably as occasion demands.

The liquid-crystal cell to be used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

A suitable material can be used as the polarizer. From the point of view of obtaining good-contrast display owing to incidence of high-grade linearly polarized light, etc., a material which is high in the degree of polarization such as an absorption type linear polarizer of iodine or dye can be used preferably. Incidentally, the polarizer may be provided on both sides of the liquid-crystal cell 42 as shown in FIG. 1 or may be provided only on a single side of the liquid-crystal cell.

When the liquid-crystal display device is formed, a suitable optical device such as a diffusing plate, an anti-glare layer or a protective layer to be provided on the visual side or a compensatory retarder plate to be provided between the liquid-crystal cell and the polarizer can be arranged suitably. The compensatory retarder plate is provided for compensating for wavelength dependence of birefringence, or the like, to attain improvement of visibility, or the like.

The compensatory retarder plate is disposed either between the visual side polarizer and the liquid-crystal cell or between the back side polarizer and the liquid-crystal cell as occasion demands. According to the present invention, from the point of view of keeping the light output characteristic of the light pipe as sufficiently as possible, it is preferable that the optical layer disposed between the liquid-crystal cell and the light pipe is as small as possible.

Incidentally, a suitable material in accordance with the wave range can be used as the compensatory retarder plate. The compensatory retarder plate may be formed as a single layer or as a multilayer of two or more retarder plates.

Figure 3:
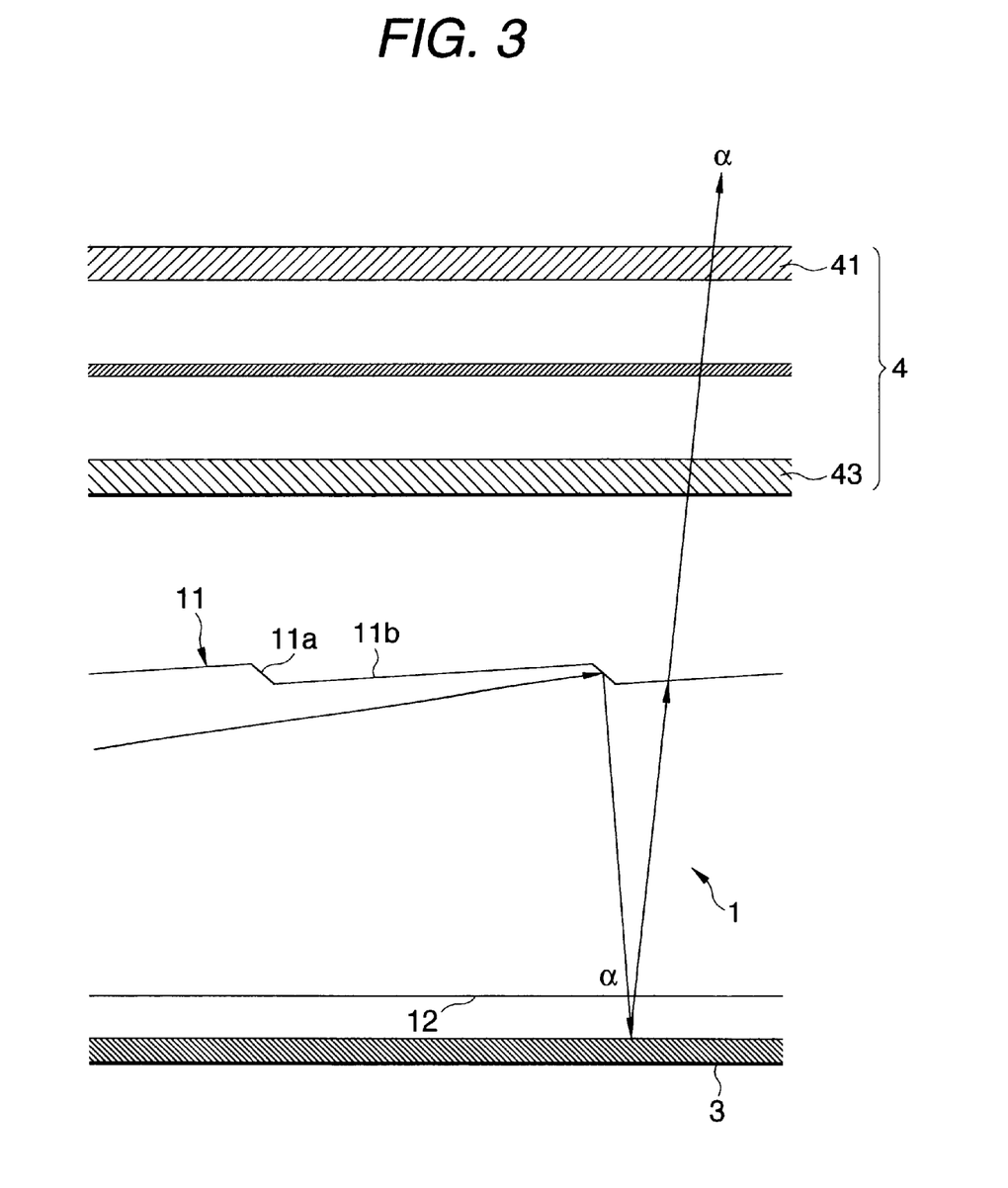
FIG. 3 is a view showing a viewing state in a transmission mode.

The liquid-crystal display device according to the present invention is viewed through light transmitted through the long side surfaces of the light pipe as described above. Incidentally, in a transmission mode, light α exiting from the lower surface of the light pipe 1 in an ON state of the light source as indicated by the arrow in FIG. 3 is reflected by the reflection layer 3 and then transmitted through the long side surfaces 11b of the light pipe 1. Hence, a display image (α) can be viewed via the polarizers 43 and 41 and the liquid-crystal cell 42.

Figure 4:
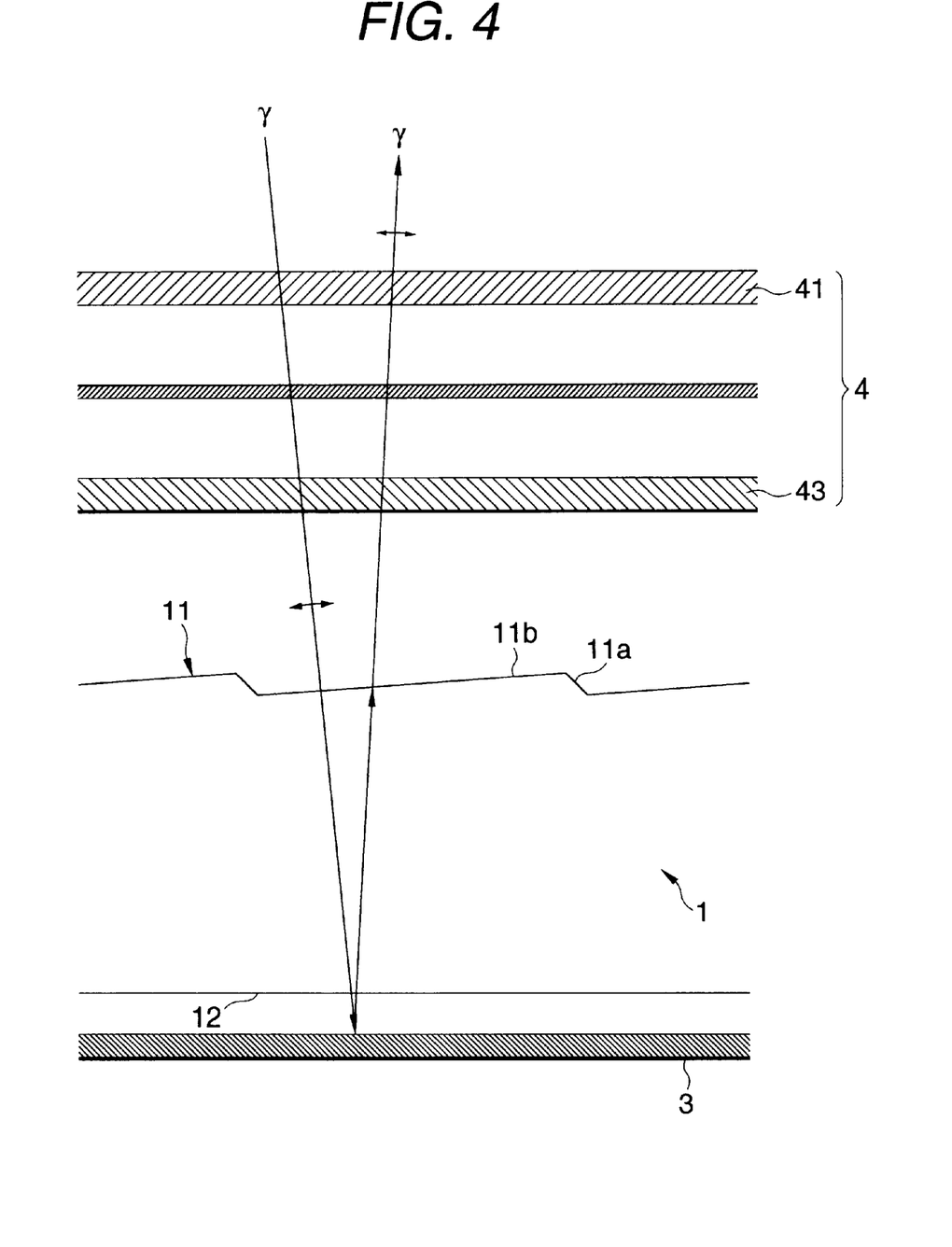
FIG. 4 is a view showing a viewing state in a reflection mode.

On the other hand, in a reflection mode, external light γ is linearly polarized by the polarizer 43 via the polarizers 41 and 43 and the liquid-crystal cell 42 in an OFF state of the light source as indicated by the arrow in FIG. 4. The linearly polarized light is transmitted through the long side surfaces 11b in the upper surface of the light pipe 1. Then, the light is reflected by the reflection layer 3 in the same manner as in the transmission mode and then transmitted through the long side surfaces 11b of the light pipe 1 in the reverse course while the state of polarization given by the polarizer 43 is kept good. Then, the light passes through the polarizers 43 and 41 and the liquid-crystal cell 42 again. Hence, a display image (γ) can be viewed.

According to the present invention, optical devices or parts such as a light pipe, a liquid-crystal cell, a polarizer, etc. for forming the aforementioned liquid-crystal display device may be wholly or partially integrally laminated/fixed onto one another or may be disposed separably. From the point of view of prevention of lowering of contrast based on suppression of surface reflection, etc., it is preferable that such parts are fixed onto one another. A suitable transparent adhesive agent such as a tackifier can be used for the fixing process. A layer of the transparent adhesive agent maybe made to contain the aforementioned fine particles so that the layer is provided as an adhesive layer exhibiting a diffusing function.

EXAMPLE 1

A polymethacrylate plate was processed into a predetermined shape in advance. A surface of the polymethacrylate plate was cut by a diamond bit to thereby obtain a light pipe having a light output means in its upper surface and having an average retardation of 4.1 nm, a maximum retardation of 8 nm and a minimum retardation of 0 nm. The light pipe was 40 mm wide and 25 mm deep. The light pipe had an incidence side surface 1 mm thick and a counter end 0.6 mm thick. The light pipe had flat upper and lower surfaces. Prism-like irregularities parallel with the incidence side surface were formed in the upper surface at intervals of a pitch of 210 μm. Each of the prism-like irregularities had a combination of a short side surface and a long side surface. The inclination angle of each of the short side surfaces was in a range of from 42.5 to 43 degrees. The inclination angle of each of the long side surfaces was in a range of from 1.8 to 3.5 degrees. The inclination angle difference between adjacent ones of the long side surfaces was not larger than 0.1 degrees. The projected width of each of the short side surfaces on the lower surface was in a range of from 10 to 16 μm. The ratio of the projected area of the long side surfaces on the lower surface to the projected area of the short side surfaces on the lower surface was not smaller than 12. Incidentally, the formation of the light output means was started from a position far by 2 mm from the incidence side surface.

A cold-cathode tube (made by Harison Electric Co., Ltd.) having a diameter of 2.0 mm was disposed on the incidence side surface side of the light pipe. The cold-cathode tube was enclosed in a light source holder made of a white lamp reflection sheet while an edge of the cold-cathode tube was brought into close contact with the upper and lower end surfaces of the light pipe. An inverter and a DC power supply were connected to the cold-cathode tube. A silver reflector bonded to an acrylic sheet was disposed on the lower surface of the light pipe. A normally white monochrome TN type liquid-crystal cell was disposed on the upper surface side of the light pipe. Thus, a liquid-crystal display device was obtained. Incidentally, the light source could be switched on/off by turning on/off the DC power supply. The silver reflector was of a diffuse type in which a vapor deposition layer of silver was formed on a matted film base and coated at its surface with a transparent resin layer so as to be protected.

EXAMPLE 2

A liquid-crystal display device was obtained in the same manner as in Example 1 except that the silver reflector was bonded to the lower surface of the light pipe through a reflection surface of the silver reflector by an adhesive layer.

EXAMPLE 3

A liquid-crystal display device was obtained in the same manner as in Example 1 except that the silver reflector was replaced by a reflection sheet having a silver mirror reflection surface and that the reflection surface of the reflection sheet was bonded to the lower surface of the light pipe through an adhesive layer containing a silicone resin.

EXAMPLE 4

A mold of a predetermined shape was used. The mold heated to 78° C. was filled with molten polymethyl methacrylate heated to 260° C. Molding was performed under cooling to thereby obtain a light pipe having a shape in accordance with Example 1 and having an average retardation of 13.0 nm, a maximum retardation of 25 nm and a minimum retardation of 5 nm. A liquid-crystal display device was obtained by use of the light pipe. Incidentally, the mold was formed so that a resin injection gate 15 mm wide and 0.6 mm thick was disposed at a distance of 40 nm from a runner and located in the center portion of the counter end of the light pipe.

COMPARATIVE EXAMPLE 1

A light pipe having an average retardation of 65.6 nm, a maximum retardation of 70 nm and a minimum retardation of 60 nm was obtained in the same manner as in Example 1 except that the pitch of the prism-like irregularities was set to be 2 mm, that the inclination angle of each of the short side surfaces was set to be in a range of from 42.6 to 42.8 degrees, that the inclination angle of each of the long side surfaces was set to be in a range of from 1.9 to 3.6 degrees and that the ratio of the projected area of the long side surfaces on the lower surface to the projected area of the short side surfaces on the lower surface was set to be not smaller than 11. A liquid-crystal display device was obtained by use of the light pipe.

COMPARATIVE EXAMPLE 2

A light pipe having an average retardation of 37.2 nm, a maximum retardation of 85 nm and a minimum retardation of 20 nm was obtained in the same manner as in Example 4 except that the mold was replaced by a mold having a resin injection gate 5 mm wide and 0.3 mm thick at a distance of 7 mm from a runner. A liquid-crystal display device was obtained by use of the light pipe.

EVALUATION TEST

Retardation

The light pipe obtained in each of Examples 1 and 4 and Comparative Examples 1 and 2 was examined on the retardation between the upper and lower surfaces. The "upper side" was equivalent to the incidence side surface. In consideration of the deflection of the optical path through the light output means, measurement was performed at respective opposite ends of four sides, respective centers thereof and the total center, that is, at 9 points in total, along the location of inward 5 mm in the circumference of the light pipe by use of light with a wavelength of 632.8 nm emitted from a helium-neon laser as a light source on the basis of a Senarmont method in which the light source, the sample, an optical device and a detector were disposed on an optical path. Incidentally, the average, maximum and minimum values were based on results of the measurement.

The results were shown in Table 1.

TABLE 1

| | | Retardation (nm) | | |
|---|---|---|---|---|
| | | Left Side | Center | Right Side |
| Example 1 | Upper Side | 5 | 3 | 5 |
| | Center | 5 | 5 | 8 |
| | Lower Side | 3 | 0 | 3 |
| Example 4 | Upper Side | 8 | 10 | 12 |
| | Center | 10 | 12 | 10 |
| | Lower Side | 15 | 25 | 15 |
| Comparative Example 1 | Upper Side | 65 | 70 | 65 |
| | Center | 65 | 65 | 60 |
| | Lower Side | 65 | 65 | 70 |
| Comparative Example 2 | Upper Side | 20 | 30 | 25 |
| | Center | 35 | 45 | 30 |
| | Lower Side | 35 | 85 | 30 |

It was apparent from Table 1 that Examples 1 and 4 satisfied the requirement of the retardation of not smaller than 40 nm in the all range used for display whereas Comparative Examples did not satisfy the requirement (Comparative Example 2 did not satisfy the requirement partially).

Coloring Characteristic

Coloring characteristic was examined in the condition that the light pipe obtained in each of Example 1 and 4 and Comparative Examples 1 and 2 was disposed between a light-diffusing reflector and a polarizer. In this examination, the retardation in a direction parallel with the axial direction of the polarizer had no influence on coloring but the retardation in other directions had influence on coloring of reflected light. The coloring due to the retardation in other directions varied in accordance with the magnitude of the retardation. That is, the color of reflected light was made dark from very light brown (at a high reflectance) so as to change to a range of from navy blue to blue.

Results of the above description were as follows. In Example 1, no coloring was viewed because the reflected light was colorless and transparent. In Example 4, the occurrence of the retardation radial from the gate portion was observed but the color was brown near to colorlessness indicating the fact that the retardation was small. On the other hand, in Comparative Example 1, the reflected light was colored to brown as a whole. In Comparative Example 2, the reflected light was colored to clear brown in the gate portion. Hence, the color changed so radially that the retardation occurred radially from the gate portion when the polarizer was rotated. Moreover, coloring to navy blue indicating a retardation of about 140 nm was observed in very proximity to the gate. Brightness The liquid-crystal display device obtained in each of Examples and Comparative Example was examined on frontal brightness in a white display state in both transmission and reflection modes by a brightness meter (BM7, made by TOPCON Corp.) Incidentally, brightness in the transmission mode was evaluated in the condition that the light source was switched on in a dark room. Brightness in the reflection mode was evaluated in the condition that the light source was switched off in a dark room and that the liquid-crystal display device was illuminated by a ring-like illumination unit disposed at a distance of 10 cm upward from the center portion of the liquid-crystal display device.

Results of the above description were shown in Table 2.

TABLE 2

| | Frontal Brightness (cd/m$^2$) | |
|---|---|---|
| | Transmission Mode | Reflection Mode |
| Example 1 | 377 | 860 |
| Example 2 | 361 | 845 |
| Example 3 | 356 | 853 |
| Example 4 | 326 | 801 |
| Comparative Example 1 | 355 | 594 |
| Comparative Example 2 | 322 | 662 |

It was apparent from Table 2 that brightness in the reflection mode in Comparative Examples 1 and 2 was lowered compared with that in Examples. In each of Examples, uniform display was obtained in observation under indoor illumination in the condition that the light source was switched off and that the liquid crystal was not operated. On the other hand, in Comparative Example 2, the neighborhood of the gate portion was dark, so that display was not uniform because of coloring in the neighborhood of the gate portion. In Comparative Example 1, the display screen was dark as a whole, so that coloring to light brown was observed compared with Examples.

On the other hand, when the reflector without reinforcement with an acrylic plate was disposed in Example 1 in the condition that the reflector was intentionally wrinkled or locally bent, the wrinkles or the like were observed distinctly in both the reflection and transmission modes so that visibility was lowered. When the reflector was bonded to the light pipe as shown in Examples 2 to 4, wrinkling, local-bending, or the like, did not occur so that always good display could be obtained.

It is to be understood from the above description that the light source can be switched on/off by turning on/off the power supply in Examples to thereby achieve a liquid-crystal display device exhibiting good display characteristic in both transmission and reflection modes, and that electric power consumption can be saved by use of the reflection mode to thereby make it possible to elongate the life of a battery used in a portable display device, etc.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising:
   a light pipe including an upper surface, a lower surface opposite to said upper surface, an incidence side surface and a light output means formed in said upper surface, said light pipe having a retardation of not larger than 40 nm between said upper and lower surfaces;
   a light source disposed on said incidence side surface;
   a reflection layer disposed on said lower surface; and
   a liquid-crystal shutter disposed on said upper surface and including a liquid-crystal cell and at least one polarizer, whereby light incident on said incidence side surface from said light source goes out from said lower surface through said light output means, the outgoing light is then reflected on said reflection layer, and the reflected light is then transmitted through said light pipe so as to go out from said upper surface finally.

2. A liquid-crystal display device according to claim 1, wherein said light is capable of being switched on and off.

3. A liquid-crystal display device according to claim 1, wherein said light output means includes at least slopes and flat surfaces, each of said slopes facing said incidence side surface and inclined at an angle in a range of from 35 to 45 degrees with respect to a reference plane of said lower surface, each of said flat surfaces crossing said reference plane at a crossing angle of not larger than 10 degrees so that a projected area of said flat surface on said reference plane is not smaller than 8 times as large as a projected area of said slope on said reference plane.

4. A liquid-crystal display device according to claim 1, wherein said light output means is constituted by a repetitive structure of continuous or discontinuous prism-like irregularities arranged at intervals of a pitch of from 50 μm to 1.5 mm, each of said prism-like irregularities having a combination of a short side surface and a long side surface, said short side surface being made of a slope inclined down from said incidence side surface toward a counter side surface opposite to said incidence side surface at an inclination angle in a range of from 35 to 45 degrees with respect to said reference plane, said long side surface being made of a slopes inclined with an inclination angle in a range of from 0 (not inclusively) to 10 degrees with respect to said reference plane so that the inclination angle difference between said long side surfaces as a whole is not larger than 5 degrees, that the inclination angle difference between adjacent ones of said long side surfaces is not larger than 1 degree, and that the projected area of said long side surfaces on said reference plane is not smaller than 8 times as large as the projected area of said short side surfaces on said reference plane.

5. A liquid-crystal display device according to claim 4, wherein the repetition pitch of said prism-like irregularities for forming said light output means is constant.

6. A liquid-crystal display device according to claim 4, wherein each of said short side surfaces in said prism-like irregularities for forming said light output means has a width of not larger than 40 μm in terms of the projected width of said short side surface on said reference plane.

7. A liquid-crystal display device according to claim 4, wherein a direction of ridgelines of said prism-like irregularities for forming said light output means is at an angle of ±35 degrees with respect to a reference plane of said incidence side surface.

8. A liquid-crystal display device according to claim 1, wherein said light pipe is provided so that light incident on said lower surface is transmitted through said light pipe so as to exit from said upper surface with a total transmittance of not lower than 90%.

9. A liquid-crystal display device according to claim 1, wherein said reflection layer disposed on the lower surface side of said light pipe is made of a gold, silver, aluminum or dielectric multilayer film.

10. A liquid-crystal display device according to claim 1, wherein said reflection layer is stuck fast to said lower surface of said light pipe so as to be integrated with said light pipe.

11. A liquid-crystal display device according to claim 1, wherein said reflection layer is provided for diffuse-reflecting light.

12. A light pipe comprising:
    an upper surface;
    a lower surface opposite to said upper surface;
    an incidence side surface;
    a light output means formed in said upper surface; and
    a reflection layer integrated with said lower surface;
       wherein said light pipe has a retardation of not larger than 40 nm between said upper and lower surfaces,
       light incident on said incidence side surface goes out from said lower surface through said light output means, the outgoing light is then reflected by said reflection layer, and the reflected light is transmitted through said light pipe so as to go out from said upper surface of said light pipe finally, and
    said light output means includes at least slopes and flat surfaces, each of said slopes facing said incidence side surface and inclined at an angle in a range of from 35 to 45 degrees with respect to a reference plane of said lower surface, each of said flat surfaces crossing said reference plane at a crossing angle of not larger than 10 degrees so that a projected area of said flat surfaces on said reference plane is not smaller than 8 times as large as a projected area of said slope on said reference plane.

13. A light pipe according to claim 12, wherein said light output means is constituted by a repetitive structure of continuous or discontinuous prism-like irregularities arranged at intervals of a pitch of from 50 μm to 1.5 mm, each of said prism-like irregularities having a combination of a short side surface and a long side surface, said short side surface being made of a slope inclined down from said incidence side surface toward a counter side surface opposite to said incidence side surface at an inclination angle in a range of from 35 to 45 degrees with respect to said reference plane, said long side surface being made of a slopes inclined with an inclination angle in a range of from 0 (not inclusively) to 10 degrees with respect to said reference plane so that the inclination angle difference between said long side surfaces as a whole is not larger than 5 degrees, that the inclination angle difference between adjacent ones of said long side surfaces is not larger than 1 degree, and that the projected area of said long side surfaces on said reference plane is not smaller than 8 times as large as the projected area of said short side surfaces on said reference plane.

14. A light pipe according to claim 13, wherein the repetition pitch of said prism-like irregularities for forming said light output means is constant.

15. A light pipe according to claim 13, wherein each of said short side surfaces in said prism-like irregularities for forming said light output means has a width of not larger than 40 μm in terms of the projected width of said short side surface on said reference plane.

16. A light pipe according to claim 13, wherein a direction of ridgelines of said prism-like irregularities for forming said light output means is at an angle of ±35 degrees with respect to a reference plane of said incidence side surface.

17. A light pipe according to claims 12, wherein light is transmitted through said light pipe so as to go out from said upper surface with a total transmittance of not lower than 90% when the light is incident on said lower surface in the condition that there is no reflection layer.

18. A light pipe according to claim 12, wherein said reflection layer integrated with said lower surface is made of a gold, silver, aluminum or dielectric multilayer film.

19. A light pipe according to claim 12, wherein said reflection layer integrated with said lower surface is stuck to said lower surface through an adhesive layer while supported by a film base.

20. A light pipe according to claim 12, wherein said reflection layer is provided for diffuse-reflecting light.

* * * * *